Jan. 24, 1961    F. J. ANASTASIO ET AL    2,968,884
FILM MOUNT
Filed Aug. 25, 1958
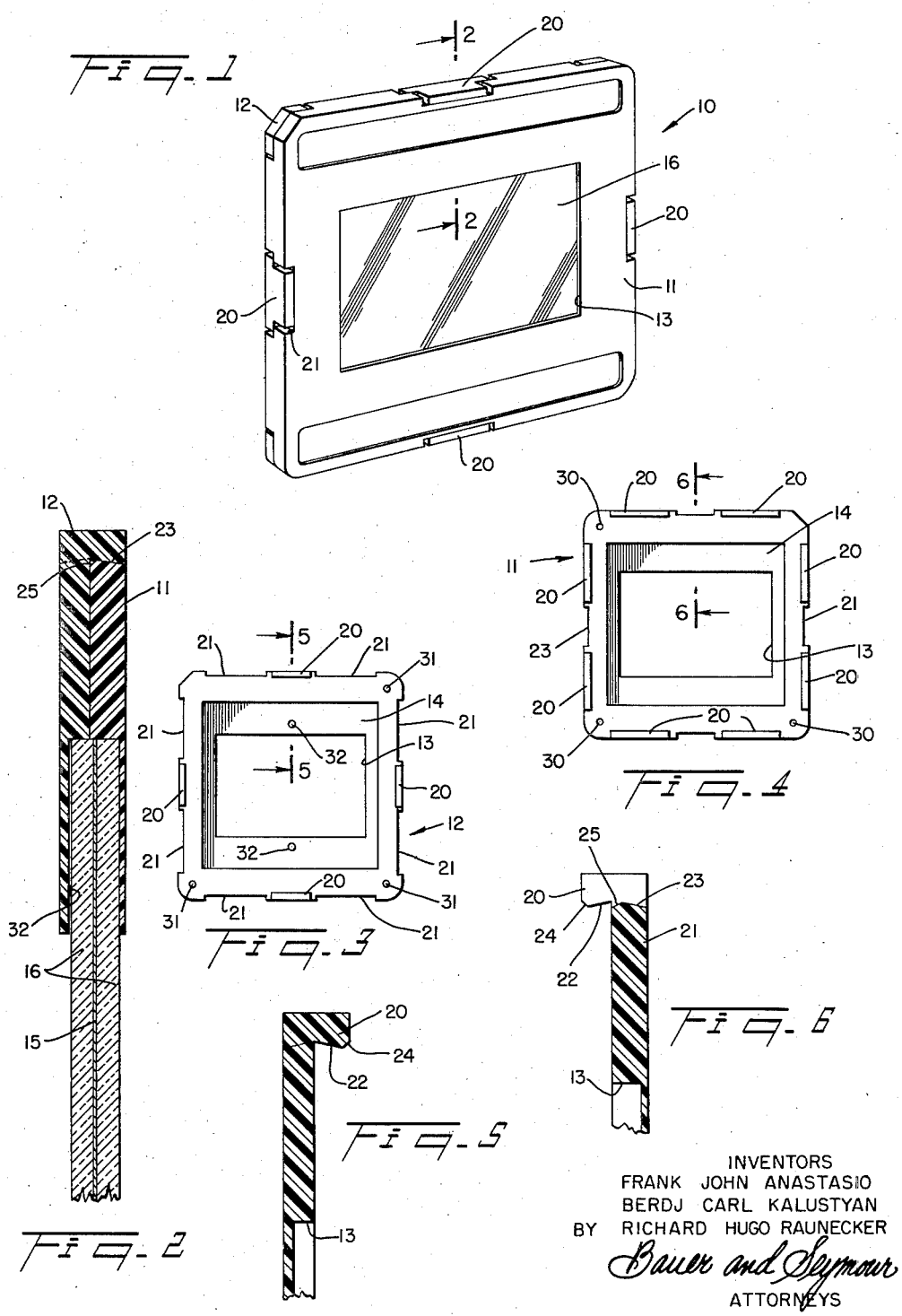
INVENTORS
FRANK JOHN ANASTASIO
BERDJ CARL KALUSTYAN
BY RICHARD HUGO RAUNECKER
Bauer and Seymour
ATTORNEYS

United States Patent Office 2,968,884
Patented Jan. 24, 1961

2,968,884
FILM MOUNT

Frank J. Anastasio, Brooklyn, N.Y., Berdj C. Kalustyan, Bergenfield, N.J., and Richard H. Raunecker, Jamaica, N.Y., assignors to Sandak, Inc., New York, N.Y., a corporation of New York Filed Aug. 25, 1958, Ser. No. 756,780

5 Claims. (Cl. 40—152)

This invention relates to a photographic apparatus and more particularly to a frame for holding a section of film for use with a projection apparatus.

This invention has among its objects the provision of a new and novel film holder which is easy to use, simple in construction, of light weight and thinner than film holders of the same general class.

Another object is to provide a new and novel frame for removably holding a section of film mounted between a pair of transparent plates.

Another object is to provide a frame for a film unit comprising a section of film mounted between a pair of transparent plates whereby the plates are compressed upon the film.

Another object is to provide a film mount of the character described which is formed of two separable resilient parts interlocked at spaced apart positions located about the peripheral edges of each part.

A further object is to provide a film mount wherein the total thickness of the assembled film mount is substantially the same as the thickness of the pair of transparent plates and the interposed film section.

A still further object resides in a film mount of the character described incorporating a novel means for interlocking the edges of the separable parts.

The above and further objects and novel features of the present invention will more fully appear from the following detail description when the same is read in connection wtih the accompanying drawings. It is to be expressly understood, however, that the drawings are for the purpose of illustration only, and are not intended as a definition of the limits of the invention.

In the drawings, wherein like reference characters refer to like parts throughout the several views, Fig. 1 is a perspective view of a film holding assembly showing an embodiment of the invention;

Fig. 2 is a cross sectional view taken on line 2—2 of Fig. 1;

Fig. 3 is a front plan view of one of the frame members comprising the film holder;

Fig. 4 is a front plan view of the other frame member comprising the film holder;

Fig. 5 is an enlarged cross sectional view of a boss member taken on line 5—5 of Fig. 3; and Fig. 6 is an enlarged cross sectional view of a groove taken on line 6—6 of Fig. 3.

One of the most common ways of viewing strips of film of the 35 mm. color transparencies class is by inserting each transparency in a projector and projecting the image on the film onto a screen. More recently, the 35 mm. slide projectors have been made automatic to the extent that a number of color transparencies are held in a slide case and each one of the transparencies are in sequence removed from the case, inserted into the projector for viewing and then returned to the slide case. The slide cases are composed of a series of slots for receiving each transparency and commercially are made with said slots wide enough to receive a transparency which has been mounted between a pair of transparent plates and bound together by masking tape at the edges so as not to unduly increase its thickness. It has been found that unless a film section is mounted between rigid plates it will bend during the projecting due to heat from the projector lamps. Consequently, there have been numerous types of frames for mounting a film section between transparent plates to solve this problem. However, all of the known film film mounts which have a pair of engaging plates to hold a film section mounted between transparent plates are too thick to be used in the commercially available cases for an automatic projector. A film mount made according to this invention, however, is thin enough to be inserted into a slot of the commercially available slide cases.

Referring now to the drawings, there is shown, by way of example, one form of the film mount constructed in accordance with this invention. The numeral 10 designates the assembled improved film mount consisting of a front frame member 11 and a rear frame member 12. The frame members 11 and 12 have openings 13 in register with each other and a section of film is mounted between the frame members and extends over these aligned openings. Light from a projector (not shown) passes through the openings 13 and through the image carried on the film and is projected upon a screen in a manner well known in the art. In the preferred embodiment, the opening 13 in one of the frame members is slightly smaller than the opening 13 in the other frame member whereby the smaller aperture acts as a mask to define the area of projection. In order to insure that there is a sharp edge for this area of projection, the marginal area of the smaller opening is bevelled as at 17 and as shown in Fig. 2. Frame members 11 and 12 are shown to be square but it is to be understood that any desired shape may be utilized. The frame members are preferably formed of a synthetic resin such as high impact polystyrene but it will be understood, however, that any other resin found suitable may be used.

Each of frame members 11 and 12 have the same overall outside shape and dimensions but are of different thickness. In the drawings, frame 11 is shown to be thicker than frame 12. As mentioned above, the opening 13 in one of the frame members is slightly smaller than the opening in the other frame member so that if the two openings are not in exact alignment there will still be a clear cut outline for the film section when the image is projected on a viewing screen. Surrounding each opening 13 in each frame member is a recessed area 14 having a length and width substantially equal to the length and width of the pair of transparent plates 16. The combined depth of the recesses 14 in frame members 11 and 12 is equal to the thickness of plates 16 with the film section 15 interposed therebetween. It will be observed in Figs. 5 and 6 that the frame 11 is thicker than frame 12 and that the recessed area 14 in frame 11 has a greater depth than the recessed area 14 in frame 12. The deeper recess 14 in frame 11 will thus receive one of the transparent plates 16, the film section 15 and a slight portion of the second transparent plate. In this manner, both of the transparent plates and the interposed film section may be properly seated and aligned within the recessed area in frame 11 while the frame 12 and its recessed area is placed in register therewith to complete the assembly.

The new and novel means for interlocking frame members 11 and 12 comprises a series of bosses and grooves alternately spaced around the peripheral edges of each of the frame members. Fig. 3 shows the frame 12 having a pair of bosses 20 and a groove 21 positioned therebetween at the peripheral edge of each side of the frame. Frame 12, shown in Fig. 4, has a pair of grooves 21 and a boss 20 positioned therebetween at the peripheral edge of each side of the frame. Since the frame members are of different thicknesses, all the bosses 20 on frame 12 will have a length equal to the thickness of frame 12. All of the bosses 20 and grooves 21 are of the same configuration and therefore a description of one boss and one groove will be sufficient for an understanding of all of them. The bosses 20 project outwardly from the same surfaces of frame members 11 and 12 in which the recessed areas 14 are formed. The boss 20 has a greater thickness at the outer end with the inner surface 22 of boss 20 tapered slightly inwardly toward the contacting surface of the frame member as shown in Fig. 5. Each groove 21 has a surface 23 tapered outwardly away from the recessed surface of the frame member and having the same angular inclination as the tapered surface 22. Thus, it will be seen in Fig. 2 that when the frame members 11 and 12 are placed into face-to-face contacting relationship, the bosses 20 on each of the frame members will engage and form an interfitting lock with the grooves 21 on the opposite frame and with the tapered surfaces 22 and 23 positively engaged to hold the two frame members together. Fig. 2 shows this interfitting engagement in greater detail. It is to be noted that the confronting end of each boss 20 has a tapered surface 24 and the confronting end of each groove 21 has a tapered surface 25. This enables the parts to more easily interlock with each other when pressure is applied to them.

The corners of frame members 11 and 12 are shown to be rounded with one corner of each having a section removed as an aid in aligning the two frame members. In a modified version of this invention a pin 30 is mounted at each of the rounded corners of frame 11 and projects outwardly from the contacting surface of the frame. Similarly located at each rounded corner on frame 12 is an aperture 31 for frictionally receiving the pins 30 when the frame members 11 and 12 are interlocked as shown in Fig. 1. Pins 30 and apertures 31 not only serve as an additional means to align the frame members 11 and 12 so that the apertures are in registry but also serve to frictionally retain the corner portions of each of the frame members when they are in assembled relationship.

When the peripheral edges of frame members 11 and 12 are interlocked in assembled relation the transparent plates 16 and film 15 will be held within the recessed areas 14 in the frame members. A further modification of the invention is shown to assist in pressing the plates 16 into closer engagement with each other by the use of a pair of lugs 32 formed on the surface of aperture 14 of frame 12. Lugs 32 are preferably centered on the wider portions of the recessed area 14. When the frame members 11 and 12 are interfittingly locked, as shown in Fig. 2, lugs 32 will exert an additional pressure on the surface of one of the plates 16 which will further compress the pair of plates 16 and the film 15.

While the present invention is herein illustrated and described in connection with a film mount for an insert unit comprising a pair of transparent plates with a section of color film of the 35 mm. color transparency type mounted therebetween, such a mount is equally well adapted for use with any size, shape or type of film or other sheet material which is advantageously mounted in a mount of this type.

Further, various changes may be made in the design and arrangement of the parts of the illustrated embodiment without departing from the spirit and scope of the invention as will now be clear to those skilled in the art. It is therefore to be expressly understood that the present invention is not limited to the particular embodiment thereof herein illustrated and described.

What is claimed is:
1. A film mount comprising a pair of thin frame members adapted to clamp therebetween a film section, each frame member having a central aperture and a surrounding recessed area, a plurality of bosses spaced about the outer marginal portion of each frame member and extending outwardly therefrom, a plurality of grooves spaced about the outer marginal portions of each frame member with the grooves on one frame alternately spaced from the grooves on said other frame member whereby when the frame members are placed into contacting relationship the bosses on each frame interlock with the grooves on the opposite frame, and wherein said boss and groove portions on each frame member are contiguous around the marginal portion of each frame thereby imparting added rigidity thereto, said frame members and the recessed areas surrounding the central aperture in each frame member being of unequal thicknesses and the bosses on each frame being equal in height to the thickness of the other frame.

2. A film mount as set forth in claim 1 wherein the inner surface of each boss is tapered inwardly toward the contacting surface of the frame and each groove surface is tapered outwardly away from the contacting surface of the frame and wherein each groove is wider than the outwardly extending portion of each boss whereby there is formed an interfitting lock when the bosses on each frame are interlocked with the grooves on the opposite frame.

3. A film mount as set forth in claim 1 wherein the depth of the recessed area on one of the rim members is greater than the thickness of one of said plates and the film section of said insert but less than the total thickness of said insert.

4. A film mount comprising a pair of resilient frame members, each frame member having a central aperture and a surrounding recessed area to provide an area for receiving a pair of transparent plates and a film interposed therebetween when said frame members are brought into face-to-face contact with each other, a plurality of contiguous grooves and bosses alternately spaced about the peripheral edge of each frame, said bosses extending outwardly from the contacting surface of each frame and each having a gradually increasing thickness toward the outer end to provide an inwardly tapering inner surface thereof, the edges of each frame at the bottom of said grooved portions being cut away from the surface to form outwardly tapered contacting surfaces having the same degree of taper as the tapered surfaces on said bosses whereby when said frame members are brought into face-to-face contact the tapered boss surfaces on each frame form an interfitting lock with a tapered groove surface on the opposite frame member.

5. A film mount as set forth in claim 4 including means mounted on the recessed area of one of said rim members whereby the transparent plates and film section are compressed when said rim members are in abutting relationship and with the outer marginal edges thereof interlocked with each other.

References Cited in the file of this patent
UNITED STATES PATENTS

| | | |
|---|---|---|
| 2,505,250 | Kime | Apr. 25, 1950 |
| 2,527,765 | Roehrl | Oct. 31, 1950 |
| 2,603,017 | Merrill | July 15, 1952 |
| 2,639,530 | Merrill | May 26, 1953 |
| 2,837,853 | Bing | June 10, 1958 |
| 2,837,854 | Bing et al. | June 10, 1958 |
| 2,874,498 | Butkevich | Feb. 24, 1959 |